UNITED STATES PATENT OFFICE.

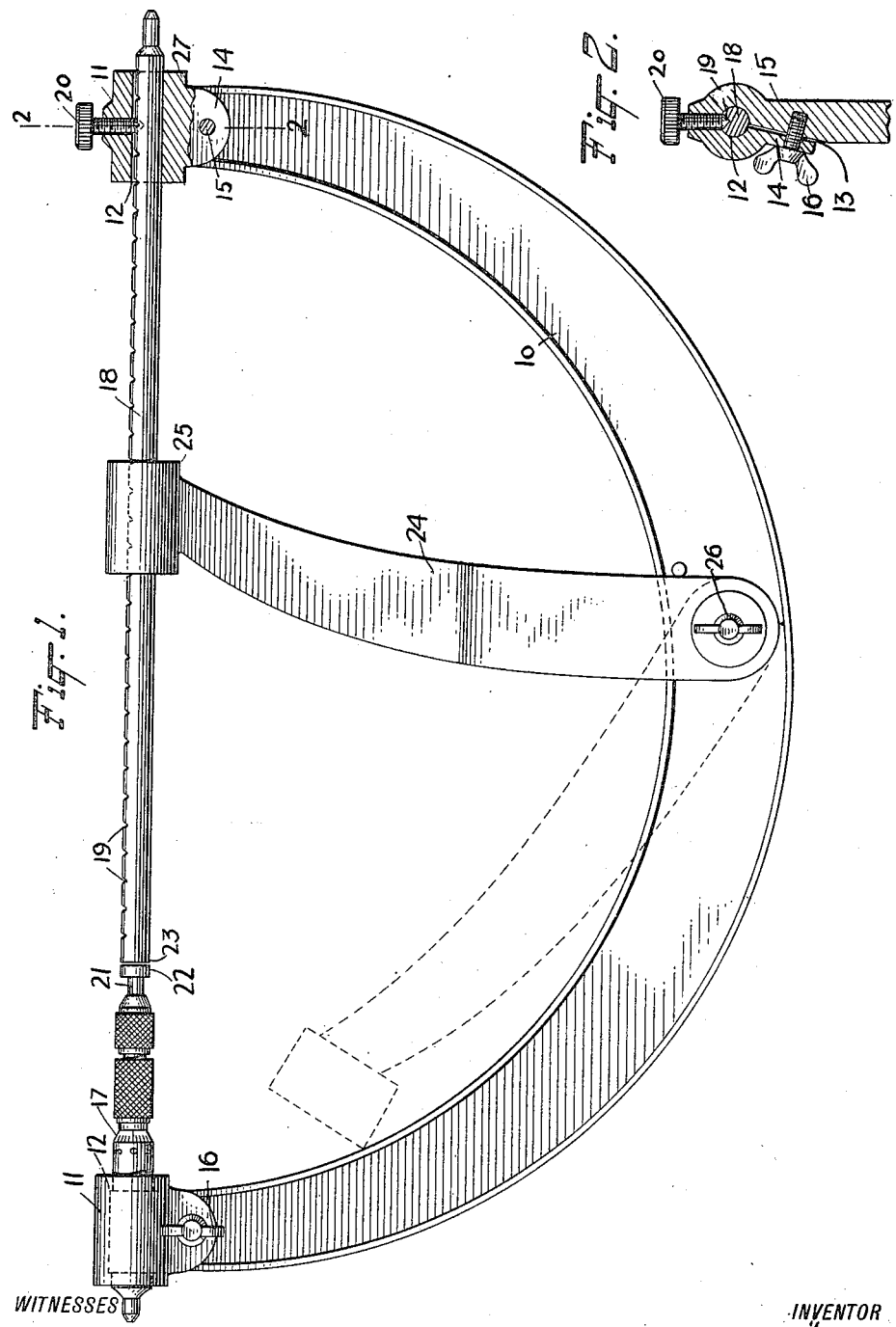

JOSEPH H. MÜLLER, OF OAKLAND, CALIFORNIA.

MICROMETER-CALIPERS.

1,075,929.  Specification of Letters Patent.  Patented Oct. 14, 1913.

Application filed November 8, 1912. Serial No. 730,157.

*To all whom it may concern:*

Be it known that I, JOSEPH H. MÜLLER, a citizen of the United States, and a resident of the city of Oakland, in the county of Alameda and State of California, have invented a new and Improved Micrometer-Calipers, of which the following is a full, clear, and exact description.

In the modern machine shop practice exact measurement is required nearly everywhere and in consequence micrometer calipers are mostly used. Where the measurements are of great difference in size, either a set of said calipers is required which is very expensive, or a caliper of large size is used, with a number of different sizes of measuring points, by means of which the variation of sizes may be obtained. The difficulty lies in the fact that whenever an exchange of measuring points is made, a calibration for the measurement must be made and adjusted, which requires time and in consequence expense.

To obviate the above outlined difficulties, I have invented a micrometer caliper, which refers more particularly to the class comprising a U-frame, having a removable micrometer screw at one end and a graduated, adjustable and reversible measuring point at the opposite end and clamping means associated with the heads of the U-frame, so that with my micrometer caliper, having only one micrometer measuring point and one graduated measuring point, any measurement from zero to the size of the U-frame can be made.

An object of the invention is to provide an inexpensive micrometer caliper simple and solid in construction, having only one micrometer measuring point and a graduated measuring point removable from the caliper frame.

A further object of the invention is to provide a caliper with which spring effect of the measuring points is eliminated.

Reference is to be had to the accompanying drawings, forming a part of this specification in which similar characters of reference indicate corresponding parts in all the views, and in which—

Figure 1 is an elevation of an embodiment of my invention with one head partly in section; and Fig. 2 is a section on line 2—2 Fig. 1.

Referring to the drawing, 10 represents a U-frame of a well known type, combining great rigidity, strength, and lightness and provided with machined heads 11 at the extremities of the frame. The heads 11 have longitudinal bores 12, having a common axis and having slits 13 leading from the lower part of the head up to the bores 12. A flange 14 provided at the lower end of the head 11 due to the slits 13 formed in the head, parallel to the flange, constitutes a spring portion of the head and a set screw 15 having a wing head 16, is screwed through the flange 14 into the frame 10, so that by screwing the set screw 15 into the frame, the bores 12 may be contracted. One of the bores 12 is of such a size as to admit the main body of a standard inside micrometer gage 17, as shown on the left side in Fig. 1, and clamped there by means of the set screw 15, tightly in position. In the other bore of the head 11, a measuring rod or anvil 18 is provided which has a uniform cylindrical surface, fitting snugly into the bore 12 and divided from end to end into equal parts, which may be according to the size of the unit used for the measurement, a larger or smaller fraction of same. In the place of the division, the rod is drilled to a certain depth and then flared in at the surface as indicated in the drawings by the numerals 19.

The heads 11 on the frame 10 are faced so as to include a certain number of the divisions, for example, four, as shown in the drawing, but it may be three or two as the case may happen, this depending on the size of the unit used. A set screw 20 is provided in the head 11 where the measuring rod 18 is fitted and the lower end of set screw 20 is tapered so as to conform with the flared portions 19 and thereby when engaged with same will exactly locate the division. The inside micrometer gage 17 receives a measuring point 21 which has a head, of the same diameter as the measuring rod 18 and between the extremities 22 of the measuring points 21 and extremity 23 of the rod 18, any measurements are made.

When the micrometer is to be used for some measurements, the rod 18 is placed so as to have its main part projecting out of the bore 12, into which it is fitted through the opposite head. The screw 20 then locates the nearest division to it and puts it in proper position. By turning the head 16 of the set screw 15, the measuring rod 18 is clamped in the bore 12 of the head 11, thus giving a certain exact length from the inner face of this head 11 to the extremity 23 of rod 18. Then the inside micrometer gage 17 with the inserted measuring point 21 is passed through the bore 12 of the other head 11 until the extremity 22 comes into contact with the extremity 23 of the rod 18, and by turning the head 16, the set screw 15 will clamp the inside micrometer gage in the head 11. It is understood that when this is done the micrometer gage 17 is placed on the zero point. Now by unscrewing the set screw 15, the measuring rod 18 is released from grip by the flange 14, and then by unscrewing the set screw 20, the measuring rod 18 is drawn in as many units as required. Then again the set screw 20 will locate the exact division and by forcing the set screw 15 to clamp the rod in the bore 12, the same is made fixed with the head 11 and any fractional measurements between those units made, can be then adjusted by the micrometer gage located in the opposite head.

When small measurements are made, the measuring rod 18 projects too far from the head in which it is located and in consequence, during the measurements, the rod 18 becomes flexible and to prevent this flexibility, I provide a reach rod 24 which has a head 25 provided with a bore through which the measuring rod 18 projects and into which it fits snugly. The end opposite the head 25 is made to straddle over the frame 10 and is provided with a clamping screw 26, and a pin 24' secured to the frame, by means of which its head is kept axially with the bores 12 of the head of the frame 10. When large measurements are made and no spring action is feared by the measuring rod 18, the reach rod 24 is displaced as shown in dotted line in Fig. 1, so as not to interfere during the measurements, or it can be entirely removed as desired.

It can be easily seen from the drawings that with my device any measurement from zero to the width of the U frame can be made with a single measuring rod or anvil 18, but it can be also advantageously used for measuring thickness in bodies which have flanges projecting from the surfaces which prevent the application of an ordinary micrometer caliper. With my device the measuring rod 18 may be inserted far enough to allow the insertion of a different measuring point in place of 21, which will prevent the projecting flange on the same side from interfering with the curved portion of the U shape of the frame 10. Then by bringing this measuring point in contact with the rod 18 fixed by the screw 20,—the position of the micrometer gage can be fixed as before described—the measuring rod 18 can be withdrawn to allow the insertion of the device for measurement, and then again inserted until the nearest division 19 will coincide with the set screw 20 when the fractional part of the measurements can be taken by the micrometer gage 17. It can also be seen from the drawings that the micrometer gage 17 can be inverted, that is, the measuring point 21 can be located on the other side of the head 11, and by having a standard hole, by means of which the projecting smaller end of the measuring rod 18 and the inverted micrometer gage can be set inside to have a standard known length, and in consequence other interior measurements can then be made within the limits of the micrometer gage 17.

When the U frame is very large, two reach rods 24 may be provided, so that the single measuring rod 18 can be supported at two points when small measurements of thickness are made, and at one point when larger measurements are made, and both of these reach rods may be removed from the frame. It can be easily seen from the drawings that the distance between the measuring points 22, 23, can be easily counted off from the end face 27 of the head 11, in which the measuring rod 18 is located, that is, when the rod 18 is drawn away from the measuring point 22, a certain number of units will be read from the face 27, thus indicating the number of the entire units, and if any fractional part of the measurements is to be found, it will be found on the micrometer gage 17, so that the exact measurements will be found by the subtraction of the number of units read off from the face 27 and the reading on the micrometer gage, or they may be found by adding, as the case and the structure of the micrometer gage may be.

Having thus described my invention, I claim as new and desire to secure by Letters Patent:

1. A device of the class described, comprising a U frame, heads at the extremities of said frame having axial bores adapted to receive measuring points, a measuring rod in one of said bores, a reach rod associated with said frame, having a bored head, and means associated with said reach rod and frame whereby the bore of said head of said reach rod is made axially with the bores of said heads of the U frame, said bore of the reach rod being adapted to engage said measuring rod and thereby prevent the deflection of same.

2. A device of the class described, comprising a U frame, the extremities of said frame having axial bores adapted to receive measuring points, a measuring rod in one of said bores, a reach rod associated with said frame having a bored head at one end adapted to be in alinement with said axial bores of said heads, and said reach rod having the opposite end straddling the frame, and clamping means associated with said straddling end whereby said rod can be placed in predetermined positions.

In testimony whereof, I have signed my name to this specification in the presence of two subscribing witnesses.

JOSEPH H. MÜLLER.

Witnesses:
FREDERICK WAGELL,
BRUNO INCIER.